June 8, 1954  S. KHALIL  2,680,463
TUBELESS TIRE
Filed March 17, 1951 2 Sheets-Sheet 1
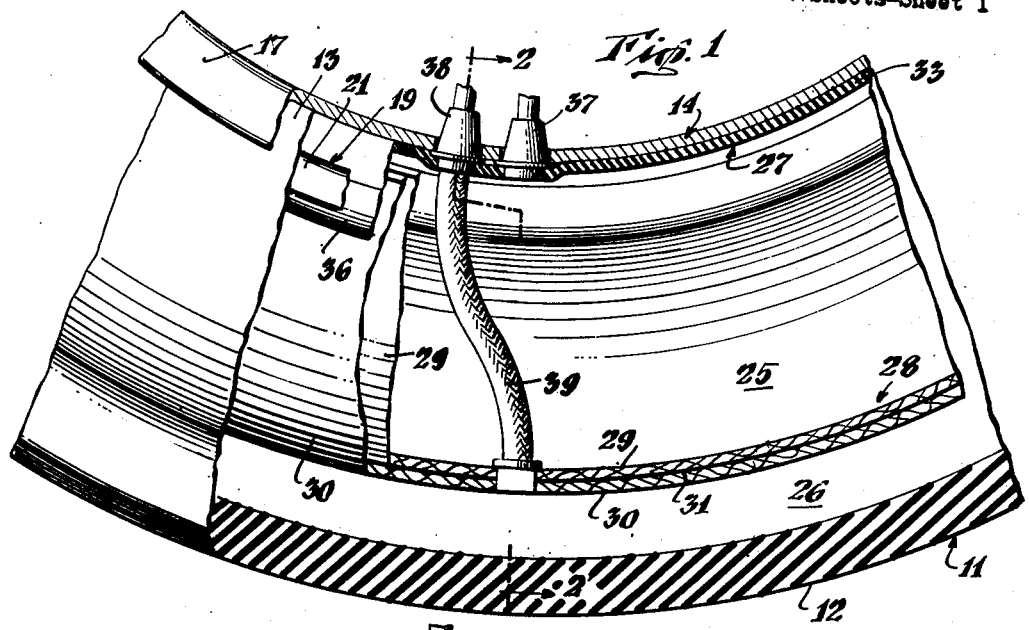
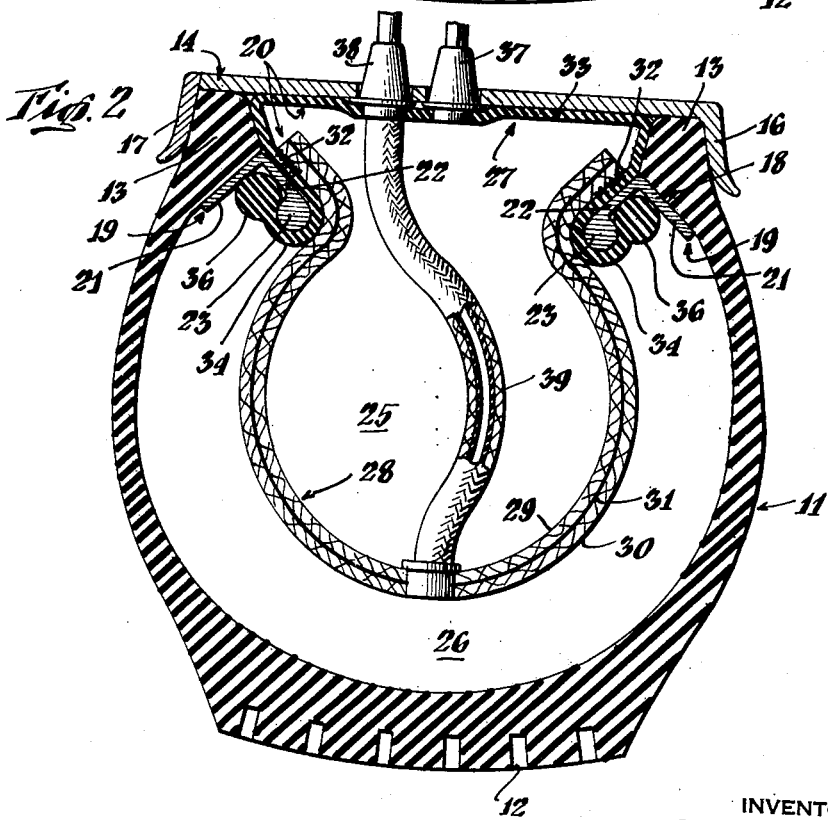
INVENTOR
SEYED KHALIL
BY M. R. Marsh
ATTORNEY

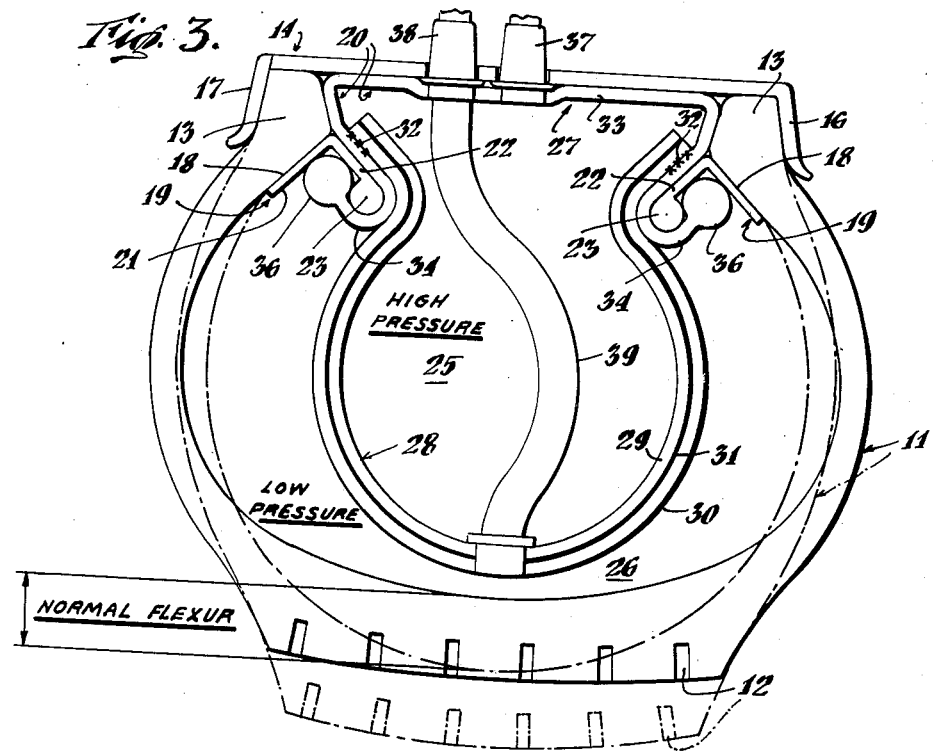
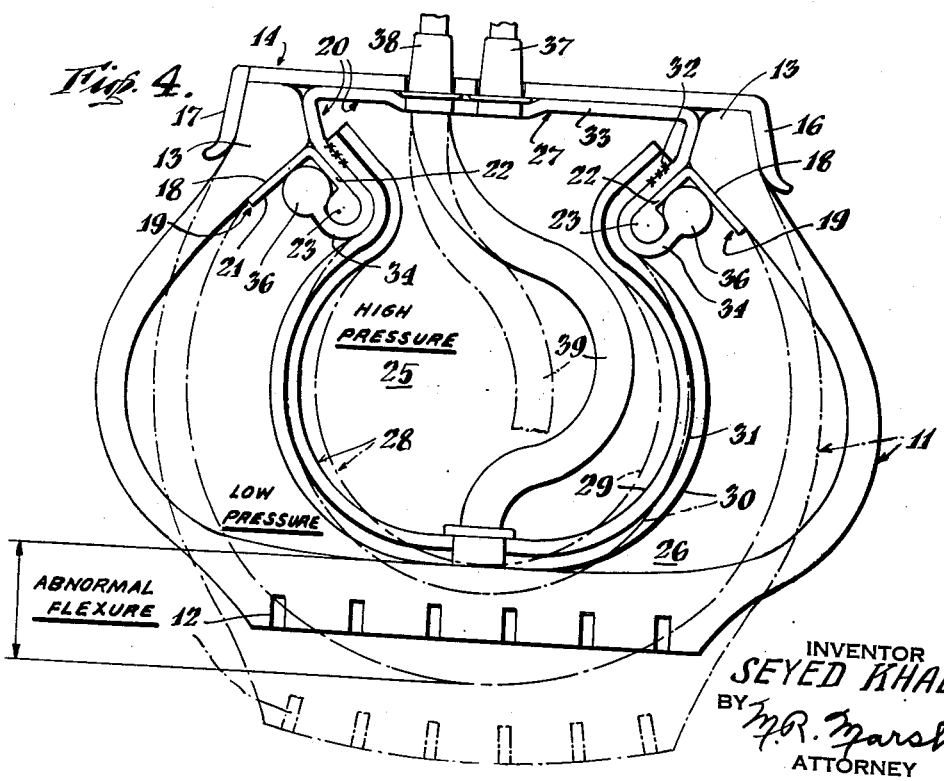

Patented June 8, 1954

2,680,463

UNITED STATES PATENT OFFICE 2,680,463

TUBELESS TIRE

Seyed Khalil, New York, N. Y.

Application March 17, 1951, Serial No. 216,187

14 Claims. (Cl. 152—339)

This invention relates primarily to the class of pneumatic tubeless tires in which the tire casing is, as is done in motor vehicle tires of the present day, conventionally reinforced and the beads thereof are also reinforced with inexpansible material such as annular wires, and in the casing of which an inner member which is herein termed a "beads-engaging safety tube" is disposed in such a manner as not to contact the inner surface of said casing at the area where said casing flexes when the tire yields; and more particularly directed to an improved tire, the casing and the inner member of which are arranged to be more easily and accurately handled (i. e. assembled together, mounted on a rim, demounted from said rim, separated from each other, inspected, repaired, replaced, etc.) than can possibly be done with tubeless tires of prior art.

A primary object of the invention is in a tire of the type specified to provide two pairs of annular male and female hooking elements having the hooking elements of each pair carried on one side of said beads-engaging safety tube; and hooking elements of each pair carried by one of said casing beads. One element of each of said annular hooking pairs is made of elastic material while the other annular element of each of said pairs is inelastic or reinforced. The diameter of one annular element of each of said hooking pairs is shorter than that of the other annular element of said pairs. The elastic element of each of said pairs is, by external applied force thereon, temporarily deformed to provide clearance for hookingly admitting the other element of said pairs and upon releasing said applied force said elastic elements of each of said pairs retract and removably interlock with said reinforced annular hooking element of said pairs in such a manner that said beads-engaging safety tube, when in engagement with said beads of the casing, may be manually pulled out from the casing, but during mounting on a rim and thereafter said casing and said beads-engaging safety tube will retain their interlocking contact under any external force applied thereto.

By "interlocking" applicant means that said beads-engaging safety tube and said casing are secured to each other before mounting them on a rim. Again, by "interlocking" applicant means that the casing and the beads-engaging safety tube are so firmly secured together that they can be mounted on any conventional rim with the conventional mounting system and tools such as the so-called tire iron, mounting machine, etc., without the slightest displacement of the contacting edges of his beads-engaging tube from the position of the beads of the casing to which said edges are removably interlocked. However, said "interlocking" has no bearing upon the holding of applicant's tire on a rim. The holding of applicant's tire on a rim is done by the admitted air pressure in the tire in precisely the same manner as is done for holding a conventional tire (with tube or tubeless) on a rim by admitted air pressure.

By "removably" applicant means that the tire (the casing with its beads-engaging safety tube) may be separated and removed from the rim upon which it is mounted, by conventional demounting system and tools such as tire iron, demounting machine, etc. Again, by "removably" applicant means that after the tire has been taken off the rim the beads-engaging safety tube can be removed from the casing just by manually pulling it out therefrom. The present invention is an improvement on the structure shown in my copending applications Ser. No. 198,365, filed November 30, 1950; and Ser. No. 204,711, filed January 6, 1951, each of which is also entitled "Tubeless Tire."

Another object of the invention is to provide two non-communicable annular concentric air chambers in a single tire casing. One of said chambers is located adjacent the rim upon which the tire is mounted and the other one of said chambers is located principally between the first one of said chambers and the inner tread and side wall surfaces of the tire casing. Each chamber is independently inflated by an associated valve. The chamber next to the tread of the casing may be inflated to a lesser air pressure per square inch than a conventional tire of the same size, while the air chamber adjacent the rim in inflated to a higher air pressure than that of the chamber adjacent to said tread.

The air chamber adjacent the tread of the casing, due to its low pressure, provides superior cushioning and traction when the vehicle upon which the tires are mounted runs on a "normal" road. The chamber adjacent the rim is adapted to (A) prevent injury to the casing and absorb shocks when the vehicle runs on an "abnormal" road such as one with excessive depressions, holes, bumps, and the like; and (B) to support the vehicle when the chamber adjacent the tread of the tire of said vehicle fails for one reason or another, such as due to a blow-out or puncture. A vehicle, one wheel of which is of shorter radius than another wheel thereof, may be operated, particularly when its speed is reduced. In other words, the blowing out of the chamber adjacent the tread of the tire will affect the speed of the vehicle, rather than the ability of said vehicle to run; that is when the chamber adjacent the tread of the tire fails the vehicle may be run with slow speed.

More specifically, an object of the present invention is to provide a tire having improved traction, greater shock absorbing ability, good lateral stability, and one which may be mounted on either a drop-center or flat rim.

Another object of the present invention is to provide a resilient wheel having improved cushioning and riding characteristics, and one of greater safety particularly in respect to the danger caused by blowouts or failure of the tire casing.

Still another object of the present invention is to provide a tire having metallic hooking grooves in the beads thereof adapted to have an improved and novel type of beads engaging safety tube hooked thereon.

The above and further objects of the invention will be more apparent in the following detailed description of the preferred embodiment thereof wherein reference is made to the accompanying drawings. In the drawings:

Fig. 1 is a fragmentary side detail view of a section of the inflated tire of the present invention with certain elements thereof broken away to more clearly show the arrangement and construction thereof, together with a section of a rim;

Fig. 2 is a sectional view taken substantially on line 2—2 of Fig. 1, showing the arrangement of the elements when the tire is inflated; and Figs. 3 and 4 are illustrative diagrams of the tire showing normal and abnormal flexures, respectively.

Referring now to Figs. 1 and 2, the tire of the present invention includes an outer casing 11 with a tread section 12 similar in outward appearance to the conventional type tire casing. The casing 11 has a pair of spaced apart rim engaging beads 13 which may contain the usual reinforcing material such as wires (not shown) commonly found in the beads of casings. The casing 11 is shown mounted on a rim 14 of the flat or demountable type, the type commonly used for truck tires and other heavy duty service. The rim 14 has radially extending flanges 16 and 17 adapted to engage the outer sides of the beads 13 with the flange 17 being removable in a manner well known in the art to permit mounting of the tire on the rim.

As shown in the drawing, the beads 13 have inner surfaces 18 which are at an angle of approximately 45° with respect to the radius of the tire, and secured to these surfaces as, for example, by vulcanizing, are annular rings 19 of substantially V-shaped cross-section. The annular rings 19 have sections 21 and 22 at approximately 90° with respect to each other, and on the outer ends of sections 22 are beads 23 of substantially circular cross-section. Since the surfaces 18 on the inside of the tire casing beads 13 are at an angle of approximately 45° with respect to the radius of the tire and the sections 21 of the annular rings 19 are secured thereto, the sections 22 of the rings 19 will extend into the cavity of the tire at an angle of approximately 45° with respect to the axis of the tire.

The annular rings 19 are adapted to serve as hooking grooves upon which an inner unit, which is termed a beads-engaging safety tube, is hooked.

The beads-engaging safety tube is indicated in general by reference numeral 20 and will hereinafter be described in detail. These hooking grooves or rings 19 may be made of metal, such as for example, spring steel. The object of spring steel is to provide a hooking groove sufficiently strong and flexible, and at the same time to permit convenient and easy hooking of said beads-engaging safety tube thereon.

In accordance with the principles of the present invention, the toroidal cavity formed by the tire casing 11 and the rim 14 is divided into two separate airtight cavities, hereinafter termed a primary air chamber 25 and a secondary air chamber 26. The primary air chamber 25, as best shown in Fig. 2, is the cavity adjacent to the rim 14, while the secondary air chamber 26 is the cavity adjacent to inner surface of the tread of the casing. The dividing of the entire tire casing cavity is accomplished by the beads-engaging safety tube 20. The beads engaging safety tube 20 comprises an elastic annular section 27, which is of such material as the inner tubes of conventional type tires, and a non-elastic annular section 28, which may be made of rubber impregnated fabrics suitably reinforced by woven wire or other suitable material. The purpose of reinforcing the annular section 28 by wires or other suitable material is to render said section 28, at least to a great extent puncture-proof. Inasmuch as the reinforcing by wires render the annular section 28 highly non-elastic the application of wire or wires is devised to enable said annular section 28 to flex as described in the following paragraphs, under certain circumstances, with the flexing of the casing as clearly illustrated in Fig. 4. Preferably, the non-elastic section 28 of the beads engaging safety tube is composed of two layers 29 and 30 vulcanized to a thin rubber-like sheet 31 separating the two layers so as to make the non-elastic section impervious to air. The elastic annular section 27 and the non-elastic annular section 28 are secured together as by vulcanizing at the positions represented by the reference numeral 32 adjacent the edges of the non-elastic section 28, as shown in Figs. 2, 3 and 4.

The securing or vulcanizing of the two annular edges of the non-elastic section 28 to the intermediate annular sides of the elastic section 27 of the beads-engaging safety tube 20 divides the elastic section 27 into two annular independent and non-communicable elastic portions; a central portion 33, and two marginal portions 34.

The ends of the marginal portions 34 of the section 27 terminate in circular shaped ribs 36 which may be stretched to hook the same over the beads or guards 23 of the annular rings 19 to install the beads-engaging safety tube 20 in the tire casing by means of elasticity and retractibility of said marginal portions 34, in a manner similar to that described in the above-mentioned copending applications Ser. Nos. 198,365 and 204,711.

The peripheral diameter of said ribs 36 is shorter than the peripheral diameter of said guards 23 as can be seen from Figs. 2, 3 and 4; accordingly the diameter of the ribs 36 must be stretched together with the marginal portions 34 in order to pass said ribs 36 over said guards 23 for inserting said rib into the hooking groove of the ring 19. Having crossed said guards 23 said ribs 36 will, due to the elastic retraction of their stretched diameter, automatically enter into the hooking grooves of the rings 19 and airtightly seat therein.

The normal (not expanded) mean peripheral diameter of each of the ribs may be equal, larger, or shorter than the mean peripheral diameter of the guards 23. The term "mean diameter of the periphery of the rib" as used here indicates the peripheral diameter of said rib taken from the point that the side surfaces of said rib across the circular cross-section thereof contact with the sides of said groove, while the term "mean peripheral diameter of the surface of the side of said groove" is employed to indicate the peripheral diameter of the surface of either side of said groove taken at the position or lines where said rib rests thereon.

If the mean peripheral diameter of the rib is either equal to or larger than the mean diameter of the groove but shorter than the diameter of the guards 23, the rib after being inserted in the groove will fully retract to its normal size, and there will occur what I shall term "total retraction." But if the mean peripheral diameter of said rib is shorter than the mean peripheral diameter of the surface of the groove, said rib will be prevented by the magnitude of said surface from fully retracting to its normal position. This will herein be termed "partial retraction."

Thus, a "totally" retracted rib will provide a hooking connection, but it may, and in many instances, will, not provide an airtight contact between the ribs and the surface of the grooves, whereas a "partially" retracted rib can provide an efficient airtight contact between the ribs and the surface of said grooves.

However, in the preferred form of the invention the normal means diameter of each of the two annular ribs is adapted to be shorter than the mean diameter of the surface of its cooperating groove. This, due to the larger mean peripheral diameter of the surfaces of said groove will, when the rib inserted in said groove, make a partial retraction only, and accordingly provide an airtight contact between said rib and said surfaces of said groove.

After installing the beads-engaging safety tube 20 in the casing 11 and inflating the same, the position of said beads-engaging safety tube 20 with respect to the casing will be that shown in Fig. 2.

The beads-engaging safety tube 20 has a valve 37 extending through an opening in the rim 14 whereby air may be admitted to the primary air chamber 25 or the circular cavity formed by the elastic section 27 and the non-elastic section 28. A second valve 38 extending through another opening in the rim 14 has a flexible tube 39 associated therewith in a manner similar to that described in applicant's Patent No. 2,574,266 issued on November 6, 1951, entitled: Flexible Valve which extends through the non-elastic section 28 whereby air admitted through the valve 38 is conveyed to the secondary air chamber 26 of the tire or the cavity formed by the outer surface of the non-elastic section 28 and the inner surfaces of the side walls and tread section 12 of the tire casing.

Functions of the air chambers

After the beads-engaging safety tube 20 is properly positioned in the casing, the latter is mounted on the rim and the tire inflated. Preferably, the primary air chamber 25 is inflated first through its associated valve 37 and then the secondary air chamber is inflated through its valve 38. Indeed it is upon the preferred order of their inflation that said chambers are termed primary and secondary. Normally, the primary chamber 25 is inflated to a pressure somewhat greater than that in secondary chamber 26 so that the primary chamber will support the vehicle upon which the tire is mounted in the event of the failure of the secondary chamber to hold air due to a puncture or blowout.

The sizes of the two chambers are so arranged that under normal loads the tire will not flex sufficiently to bring the inside surface of the tread section into engagement with the outer surface of the beads-engaging safety tube 20, as indicated in Fig. 3. However, when the tire is subjected to an abnormal flexure such as when it encounters a sharp bump or depression in the road, the casing may flex sufficiently to engage the beads-engaging safety tube and thereupon the primary chamber assists the secondary chamber in supporting such abnormal shock loads and flexures, as indicated in Fig. 4. The resiliency of the primary chamber in encountering these loads adds to the riding comfort and also tends to prevent the casing from being unduly flexed and pinched, which would otherwise cause damage to the casing.

Since the primary chamber 25 is adapted to normally prevent flexure of the casing sufficiently to cause damage, the secondary chamber 26 may be inflated to a pressure somewhat less than that required of a conventional tire of the same size to support a given load. This permits the casing to flex somewhat more freely and thereby give better traction particularly on slippery surfaces, without the danger of ruining the casing when encountering sharp bumps or depressions. Thus the tire of the present invention has the advantage of better traction, as is the case when conventional tires are underinflated, but not the disadvantage of subjecting the casing to rim cuts and side wall cracking.

From the preceding paragraphs it can be seen that the tire of the present invention is more durable than any conventional tire of the same size, and some of the more outstanding reasons for durability of my tire are:

(A) The arrangement whereby the primary chamber 25 supports the wheel in the event of a failure of the secondary chamber to hold air, such as when a puncture or blowout occurs. Thus the tire will not run flat and ruin the same, as is the case in the event of a blowout or puncture of the conventional type tire. Furthermore, if a nail, or similar object, is, after puncturing the casing, lodged therein so that its inner end presses against said reinforced section 28, the rotation of the wheel upon which said casing is mounted will not cause the end of said nail to pierce said section 28; hence the purpose of strongly reinforcing said section 28.

(B) The arrangement whereby the casing of the tire of the present invention is not subjected to abnormal flexures so that, other things being equal, the tire will last longer; and (C) The elimination of the conventional type of inner tube which is likely to blow out and result in extensive damage to the tire casing.

The above advantages incorporated in the tire of the present invention provides a tire with superior traction and cushioning ability, greater safety, and one more economical to use on a mileage basis.

While the invention has been described in but the preferred form, it will be obvious to those skilled in the art that various modifications may

What is claimed is:

1. In a pneumatic tire, a casing having a pair of spaced apart rim engaging beads, an annular inner tube having provided on each side thereof an annular elastic anchor concentric therewith for releasably mounting and airtightly holding the same in said casing at a position adjacent the beads thereof, said elastic anchor including an annular rib of substantially circular cross-section and an elastic circular web secured at one edge to said tube and at the other edge to said rib, an annular metallic anchorage secured to each of the beads of said casing to house said anchors, said anchorage being formed to provide at an open end thereof a guard of a circular cross-section formation upon which said elastic web is tightly stretched when said rib portion of said anchor engages said anchorage.

2. In a tubeless pneumatic tire, a casing having a tread and side walls terminating in spaced rim-engaging beads, a fluid impervious envelope received within said casing, complementary interlocking elements provided by said casing and envelope respectively resiliently engaging one another in fluid tight relationship, said envelope comprising a flexible inextensible wall portion extending between said beads in opposed spaced relationship to said tread and side walls, and an extensible resilient wall portion bridging said beads for engagement with a rim, said inextensible wall portion and opposed casing walls defining therebetween an annular fluid tight chamber.

3. The invention as set forth in claim 2 wherein an inflation tube penetrates a wall of said envelope.

4. The invention as set forth in claim 2 wherein a flexible reinforced inflation tube extends through said envelope for communication with said chamber.

5. The invention as set forth in claim 2 wherein certain of said interlocking elements are resilient.

6. The invention as set forth in claim 2 wherein certain of said interlocking elements are resilient and deformable.

7. The invention as set forth in claim 2 wherein the interlocking elements provided by said casing are metallic.

8. The invention as set forth in claim 2 wherein said interlocking elements have enlarged ends.

9. The invention as set forth in claim 2 wherein said interlocking elements have enlarged ends in overlapping relationship.

10. The invention as set forth in claim 2 wherein said interlocking elements have terminal portions disposed substantially normal to the walls of said casing adjacent said beads.

11. The invention as set forth in claim 2 wherein certain of said interlocking elements are integral with said resilient wall portion.

12. The invention as set forth in claim 2 wherein said inextensible wall portion is reinforced.

13. The invention as set forth in claim 2 wherein said fluid impervious envelope defines a chamber concentric with that defined between said envelope and casing.

14. The invention as set forth in claim 2 wherein said inextensible wall portion and extensible wall portion are united adjacent said beads.

References Cited in the file of this patent

UNITED STATES PATENTS

| Number | Name | Date |
| --- | --- | --- |
| 1,626,512 | Clark | Apr. 26, 1927 |
| 1,653,054 | Mack | Dec. 20, 1927 |
| 1,889,799 | Clark | Dec. 6, 1932 |
| 2,150,648 | Eger | Mar. 14, 1939 |
| 2,200,916 | Crowley | May 14, 1940 |
| 2,224,066 | Shore | Dec. 3, 1940 |
| 2,277,145 | Pierce | Mar. 24, 1942 |
| 2,451,277 | Crowley | Oct. 12, 1948 |
| 2,553,319 | Hruska | May 15, 1951 |
| 2,554,815 | Church | May 29, 1951 |